(No Model.)
S. C. C. CURRIE.
APPARATUS FOR AUTOMATICALLY CHARGING SECONDARY BATTERIES.
No. 410,153. Patented Sept. 3, 1889.
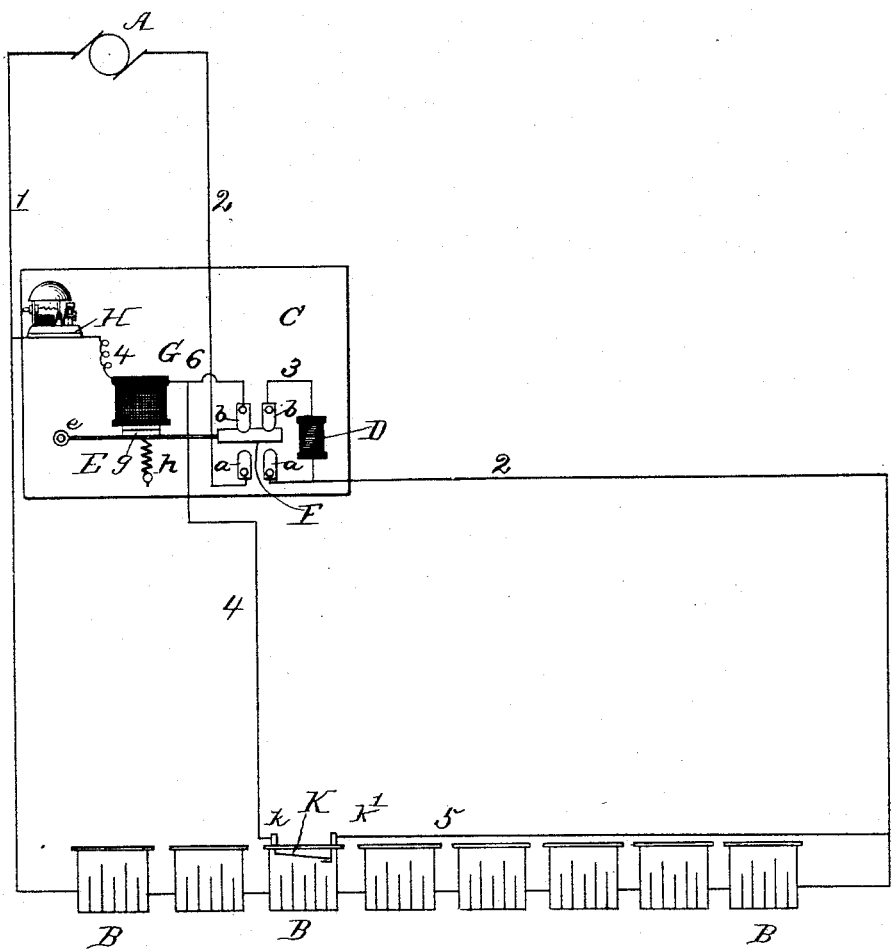
WITNESSES.
Albert B Blackwood
G. Smith
Stanley C. C. Currie
INVENTOR
by Connolly Bros
Attys

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

APPARATUS FOR AUTOMATICALLY CHARGING SECONDARY BATTERIES.

SPECIFICATION forming part of Letters Patent No. 410,153, dated September 3, 1889.

Application filed November 21, 1888. Serial No. 291,443. (No model.)

*To all whom it may concern:*

Be it known that I, STANLEY C. C. CURRIE, a subject of the Queen of Great Britain, residing at Philadelphia, in the county of Philadelphia and State of Pennsylvania, have invented certain new and useful Improvements in Apparatus for Automatically Charging Secondary Batteries; and I do hereby declare the following to be a full, clear, and exact description of the invention, reference being had to the accompanying drawing, which form part of this specification.

The present invention has relation to apparatus for automatically charging secondary batteries or accumulators, and has for its object the provision of novel means whereby a secondary battery or a set of secondary batteries will be automatically thrown into circuit with a charging-battery or electric machine or other source of electric supply when sufficiently discharged, and when sufficiently charged will be automatically thrown out of circuit with the said source of electric supply.

My invention has for its further object the provision of means for indicating, by means of a visual or audible signal, any accidental interruption of the proper operation of the automatic cut-out devices.

Various means have been hitherto employed in the effort to automatically throw a secondary battery in and out of circuit, all dependent for operation upon the rise and fall of electro-motive force of the battery-current; but a serious, if not fatal, objection to the use of the various apparatus is the unreliability of operation, due to the very small range of difference between the electro-motive force of a fully-charged battery, which is about 2.2 volts, and the minimum discharge electro-motive force, which is about 1.8 volts, which requires a very delicate and sensitive adjustment of the circuit-shifting mechanism. A further objection to the employment of apparatus dependent for operation upon the attainment of a certain degree of electro-motive force is that in case a single cell of the battery should become short-circuited the electro-motive force will not rise to the required point, and meanwhile all the cells in the battery except that one which is short-circuited will become overcharged. Furthermore, the periods of operation of an apparatus dependent upon rise and fall of electro-motive force are not sufficiently accurate, especially when the charging rate is apt to vary, as is usually the case.

In carrying my present invention into effect I avoid the above-mentioned objections by the employment of electro-magnetic shifting apparatus, operable by a current of the minimum electro-motive force, and thrown into or out of action by the establishment of a circuit therethrough by means of the devices described in Letters Patent granted to me December 4, 1888, Nos. 393,744 and 394,100.

Referring to the accompanying drawing, which is a diagram illustrating the arrangement of circuits and appurtenant parts of an apparatus constructed according to my invention, A designates a dynamo-electric machine or other electric generator, and 1 and 2 the conductors conveying current therefrom to a secondary battery composed of cells B B B, arranged in series. A switch-board C, arranged at any convenient point in the proximity of the generator A or batteries B, is provided with two contact-points *a a*, which are terminals of the circuit 2, and two contact-points *b b*, which are terminals of a circuit 3, containing a resistance D.

E designates a lever pivoted at *e* to the board C, and carrying on its end a metallic block F, that connects the contact-points *a a* or the contact-points *b b*, accordingly as the lever is swung in one direction or the other, and G designates an electro-magnet, the armature *g* of which is attached to and carried by the lever E. A retractile spring *h* is attached to the lever E, the whole forming a switching device whereby circuit is established through one of the pairs of contact-points *a a* or *b b* and broken through the other, accordingly as the magnet G is energized or de-energized. An electric bell or other signal H is also arranged upon the board C, and a circuit 4 4 extends from a point on conductor 1 through the magnet of signal H, thence through the electro-magnet G, and from there to one of the terminals $k$ of a circuit-making device K, arranged over one of the cells B of the secondary battery. This circuit-making device is constructed in accordance with and operates in the manner of the circuit-making devices described and claimed in my before-mentioned Letters Patent, and comprises, essentially, two terminals arranged in proximity to the surface of the fluid in the cell, and in such juxtaposition that the spray evolved from the cell when the same is fully charged will settle upon and establish an electric circuit between the said terminals. A conductor 5 connects the second terminal $k'$ of the device K with conductor 2, and the conductor 3 is connected at 6 to the conductor 4.

Operation: When the cells B B B have been discharged, the magnet G is inactive, and circuit is completed from the dynamo through conductors 1 2, contact-points $a\ a$, and block F. When the battery has become fully charged, the spray rising from the cell containing the device K settles upon the terminals of the same and establishes an electric circuit through magnet G and also through magnet of signal H, whereupon the signal is operated, thus indicating that the batteries are fully charged, and simultaneously the circuit is broken between contacts $a\ a$ and established through contacts $b\ b$. As the circuit 3 contains considerable resistance, only a small portion of current will pass therethrough, just enough, in fact, to hold the armature of magnet G up to its poles. Should the electro-motive force of the battery be below the standard, as by the short-circuiting of one of the cells, then the current through the circuit 3 will be insufficient to sustain the armature of magnet G against the spring or gravity of arm E, and the latter falls, again establishing contact between points $a\ a$ and circuit through 4 4, whereby the magnet G and the signal-magnet are again energized, this operation being repeated until the short circuit or other imperfect condition of the battery is corrected. Should the electro-motive force of the battery be normal—that is, not below the minimum, (which is sufficient to maintain the armature of magnet G in contact with the poles)—then the circuit through 3 4 will be maintained until the battery has sufficiently discharged, when the magnet G will be deenergized and the charging-circuit thereby established.

Having described my invention, I claim—

1. In an automatic circuit-changer for secondary batteries, the combination of a generator, a secondary battery, a main circuit connecting the same, a circuit-making device arranged above a cell of said battery, an electro-magnetic switch adapted to make and break said main circuit, an electro-magnetic signal, and a resistance-circuit having contact-points adapted to be connected by said switch, the circuit-making device, switch-magnet, and signal being arranged in a branch of the main circuit, all substantially as described.

2. In an automatic circuit-changer for secondary-battery plants, the combination of the generator, the battery, a pair of terminals arranged in the vicinity of said battery and adapted to be electrically connected by spray arising from said battery, and an electro-magnetic switch having its magnet arranged in a branch including said terminals and in a branch circuit containing a resistance and having a spring-retracted armature adapted to alternately close the main-line circuit and said branch circuit, whereby said switch is adapted to automatically break the main circuit between the generator and the battery when the latter has become charged and to automatically complete the main-line circuit when the battery is discharged, substantially as described.

3. In an automatic circuit-changer for secondary-battery plants, the combination, with the generator, battery, and conductors connecting the same, of a circuit-making device, and an electro-magnetic switch adapted to open and close the main circuit and to open and close a branch circuit extending from the magnet of the switch around the contact-points of said main circuit, substantially as described.

4. In an automatic circuit-changer for secondary-battery plants, the combination of a generator A, batteries B B, connected to said generator by a main line and return-conductor 1 2, an electro-magnet G, having a spring-retracted armature-lever E, adapted to open and close contacts $a\ a$ of return-conductor 2, a circuit-making device K, arranged in the vicinity of the batteries B B and in circuit with the magnet G, and a high-resistance circuit 3, having contact-points $b\ b$, adapted to be closed by said armature-lever and constituting a branch circuit from the magnet-circuit 4 to the return-conductor 2, all constructed and arranged substantially as described.

In testimony that I claim the foregoing I have hereunto set my hand this 19th day of November, 1888.

STANLEY C. C. CURRIE.

Witnesses:
MORRIS R. BOCKIUS,
C. E. MORGAN, Jr.